Figure 1:
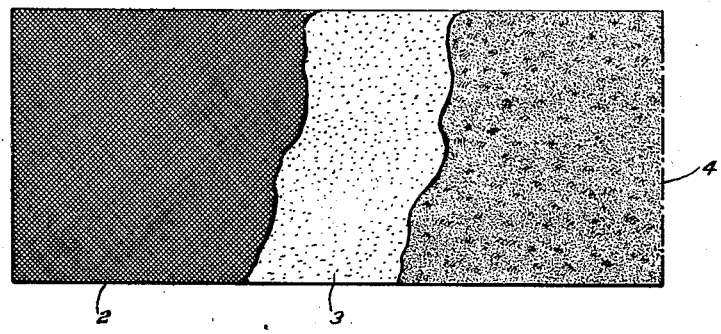

March 9, 1943.  B. R. BILLMEYER  2,313,507
METAL WINDOW CHANNEL
Filed Jan. 23, 1940

Inventor
Bruce R. Billmeyer
by
Walter & Kaufman
Attorney

Patented Mar. 9, 1943

2,313,507

UNITED STATES PATENT OFFICE 2,313,507

METAL WINDOW CHANNEL

Bruce R. Billmeyer, Lancaster, Pa., assignor to Armstrong Cork Company, Lancaster, Pa., a corporation of Pennsylvania Application January 23, 1940, Serial No. 315,231

4 Claims. (Cl. 189—76)

This invention relates to metal window channels, and more particularly, to a gasket strip adapted to be placed in a metal channel to receive a window glass, such as a sheet of laminated safety glass, and to conform to the channel and the glass, bonding the glass to the channel. Such strips serve to cushion and to reduce the transmission of shocks to the glass, form a waterproof joint between the glass and the metal channel forming its supporting frame, and eliminate squeaks and rattles created by the glass rubbing against the metal channel.

Laminated safety glass generally consists of two sheets of plate glass bonded together by a comparatively soft, plastic binder. Consequently, if considerable pressure be used in the assembly operation, such soft, plastic binder tends to extrude, thus permitting the glass to distort and crack. Accordingly, gasket strips which depend primarily upon friction developed through pressure for their gripping property to the glass are unsatisfactory when used with laminated safety glass.

Gasket strips, to be satisfactory for use with laminated safety glass assemblies, must be permanently tacky or adhesive in order to securely grip or hold the glass to the channel while requiring a minimum of pressure during the assembling operation. Such degree of tackiness or adhesiveness must fall within a certain predetermined range since, if the gasket strip be too tacky, it cannot be economically manufactured or assembled with the metal channel and the glass, while if it be insufficiently tacky, excessive pressures are required during the assembly operation in order that it might securely grip the glass. In addition to the requirement of tackiness, gasket strips need be moisture-resistant, compressible, and economical. They need be moisture-resistant in order to obviate seepage of water between the glass and the channel. They need be compressible in order that the strips in use expand and fill all voids between the glass and the channel. If the strip be expensive in manufacture, it cannot be used, even though it possess the other characteristics discussed above.

The chief object of my invention is to provide a permanently tacky gasket strip adapted to be placed within a metal channel to receive the edge of a glass and to conform and adhere thereto, serving to reduce the transmission of shocks to the glass. An object of my invention is to provide a permanently tacky, compressible gasket strip adapted to be placed in a metal channel to receive a window glass and to frictionally and adhesively grip such glass. A further object is to provide a permanently tacky, compressible, extensible gasket strip which may be stretched to conform to a glass and which frictionally and adhesively grips such glass in use without necessitating excessive pressure for assembly of the glass with the metal channel.

This invention relates to a gasket strip adapted to be placed within a metal channel to receive the edge of an adjoining element, such as the edge of a glass, conforming and adhering thereto, which comprises a fibrous backing having a thin, flexible, permanently tacky coating thereon, the adhesion of such coating to a glass when applied thereto falling within the range of six to fifteen pounds, as measured by the Kinzer test.

This invention further relates to a composition of matter adapted for use as a compressible, permanently tacky coating for gasket material, which comprises rubber hydrocarbon, asphalt, a softener, cork granules, and fibers.

Figure 2:
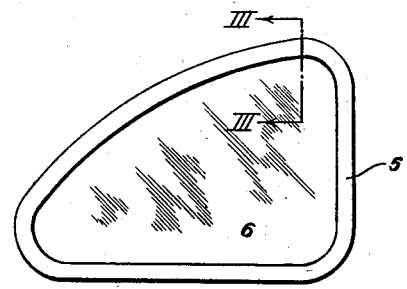
Figure 3:
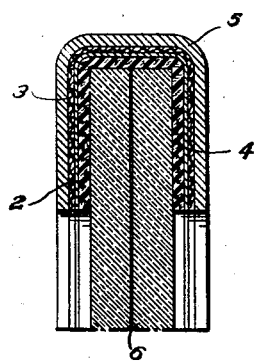

The attached drawing illustrates a preferred embodiment of my invention, in which Figure 1 is a plan view of the preferred form of gasket strip, partially broken away to illustrate the fabric backing;

Figure 2 is a view in elevation illustrating a glass mounted in a metal frame of channel shaped cross section wherein the edge of the glass is sealed by using a gasket strip constructed in accordance with my invention; and Figure 3 is a sectional view taken on the line III—III of Figure 2.

In the illustrated embodiment of my invention, there is shown a gasket strip comprising a fabric base 2 coated or impregnated with a thin layer of moisture-resistant substance 3 and carrying a thin, permanently tacky, compressible coating 4 of cork and unvulcanized rubber composition. Such fabric base 2 may consist of any suitable fibrous material possessing sufficient strength for the purpose to which it is applied and which can be economically produced. Preferably, I use an extensible woven fabric prepared, for example, as disclosed in the copending application of Frank H. Carman, Serial No. 315,232, filed January 23, 1940. In such fabric, the warp and filler threads extend diagonally of the longitudinal axis of the strip which substantially increases its extensibility longitudinally and laterally of the strip and obviates unravelling in use. It will be understood, however, my invention is not limited to the use of such specific type of extensible fabric since I have found other types of fabrics may be satisfactorily used with the permanently tacky, compressible coating of my invention.

The fabric base 2 is coated or impregnated with a water-proofing solution, for example, latex or other rubber solutions or dispersions, leaving a moisture-resistant residue 3. Other waterproofing solutions may be used, however, provided the moisture-resistant residue is adhesive and flexible in use. Rubber coating solutions are well known in the industry and it is not believed a lengthy description of the process of making such moisture-resistant coating is required.

The fabric base 2 may be coated or impregnated by any suitable means and passed through drying ovens to remove or evaporate moisture or solvent. The fabric may be impregnated by running it through a pool of rubber dispersion or solution, and then through rollers to squeeze off any excess solution; or the solution may be applied to the fabric by means of scraper or spreader blades.

The fabric 2 carrying the moisture-resistant residue 3 is then passed through an ordinary rubber calender well known in the art which applies a permanently tacky, compressible coating or layer 4 of cork and unvulcanized rubber composition to one face of the fabric. If desired, a similar coating may be applied to the opposite face of the fabric 2 in the same manner. The coating 4 may be prepared by mixing the following ingredients together on a standard two-roll rubber mill; crepe rubber 65 parts by weight, reclaimed rubber 70 parts by weight, Trinidad asphalt 100 parts by weight, rosin oil 20 parts by weight, petrolatum 5 parts by weight, cotton fibers 50 parts by weight, whiting 100 parts by weight, 20/40 cork granules 50 parts by weight.

Reclaimed rubber consists of approximately 50% rubber hydrocarbon and 50% non-rubber constituents. Accordingly, I use the term "rubber hydrocarbon" to denote the amount of rubber present in the composition; thus, it will be noted the rubber hydrocarbon (65 parts rubber plus 50% of 70 parts reclaimed rubber yielding 35 parts rubber) and the asphalt are present in the composition in substantially equal proportions. By 20/40 cork granules is meant granulated cork which will pass a 20 mesh/inch screen and lie on a 40 mesh/inch screen. Where a more dense or lighter composition is desired, finer or larger cork granules may be used.

To obtain the required permanently tacky or adhesive property in the coating, I have found it essential that the asphalt be present in approximately equal proportions with the rubber hydrocarbon. It is also desirable that softeners be used, else the coating might be stiff and not possess the necessary flexibility for conforming to the shape of the channel and the glass.

As pointed out above, the property of compressibility may be controlled largely by the amount and particle size of the cork granules. In place of Trinidad asphalt I may use any asphaltic-like bodies such as asphalts or pitches, having a melting point within the range of 180°–220° F. The amount of rubber hydrocarbon present in the composition may be obtained in any desired way; all crepe rubber may be used, or all reclaimed rubber may be used as desired. Rosin oil and petrolatum are used in the composition as softeners. In their place, I may use other mineral oils or vegetable oils such as cotton-seed oil. The cotton fibers are used to add strength to the composition; other fibers may be used if desired, such as asbestos fibers, woolen fibers, rayon fibers, or the like. Whiting is used as a filler. Other fillers may be used in its place, such as clay, asbestine, or barytes.

As discussed above, it is essential that the coating be permanently tacky or adhesive within certain predetermined limits, in order that it will positively adhere to laminated safety glass without necessitating excessive pressure during the assembly operation which, of course, would extrude the soft, plastic binder and permit the glass to distort or crack. I have found that a coating having permanently tacky or adhesive properties, falling within the range of six to fifteen pounds as measured by the Kinzer test, is satisfactory for use as a coating for gasket material and does not necessitate the use of excessive pressure during the assembly operation. The adhesion of the coating composition disclosed above to a glass when applied thereto falls within such range and is about twelve pounds, as measured by the Kinzer test.

The Kinzer test is carried out as follows:

A 1 square inch area of gasket material is applied to a clean plate glass with the cork and unvulcanized rubber composition layer in contact therewith. A load of 100 pounds is applied by means of a static load indentation machine to such strip for a period of 1 minute. After 1 minute, the load is released. Then, by means of a spring balance, the strip is pulled in a direction parallel to the surface of the glass so as to produce shear forces on the bond between the glass and the cork and unvulcanized rubber composition. This is a simple test, easily performed, which definitely differentiates between a tacky or adhesive material and one which does not possess such characteristics. It is essential that a gasket strip satisfactory for use with laminated safety glass possess permanently tacky or adhesive characteristics falling within the range of six to fifteen pounds, and preferably about twelve pounds, as measured by the Kinzer test.

In Figures 2 and 3 I have illustrated a strip placed in a metal channel 5 forming a frame to receive a safety glass 6. The gasket strip conforms to the glass and to the channel and bonds to the glass, thus holding it firmly in place in the metal channel. If the coatings 4 by applied on both sides of the fabric base 2, it likewise bonds to the metal channel 5.

My invention provides a permanently tacky, compressible gasket strip possessing recovery characteristics which in use cause it to fill all voids between a laminated window glass and a metal channel forming its supporting frame, and which is sufficiently tacky or adhesive to definitely grip and adhere to the glass which, of course, obviates the necessity for the application of enormous pressure during assembly. The gasket strip of my invention combines adhesive and frictional gripping forces definitely insuring greater holding power with lower applied pressures during the assembling operation, thus permitting my gasket material to be entirely satisfactory when used with laminated safety glass. Preferably, the gasket strip is extensible so that it may be stretched to conform to corners and curved assemblies and does not unravel even when cut in strips, since the warp and filler threads extend diagonally of the longitudinal axis of the strip. The fabric is dark in appearance, so that it is substantially invisible when the gasket strip is in use. It is moisture-resistant, thereby enhancing its life and permitting it to be used for long periods without replacement.

While I have described and illustrated a preferred embodiment of my invention, it will be understood my invention is not limited thereto, since it may be otherwise embodied as illustrated within the scope of the following claims.

I claim:

1. A gasket strip adapted to be placed within a metal channel to receive the edge of an adjoining element such as the edge of a glass and to conform and to adhere thereto, comprising a fibrous backing having a thin, compressible, permanently tacky coating thereon of cork, asphalt and unvulcanized rubber hydrocarbon, the rubber hydrocarbon and the asphalt being present in said coating in substantially equal proportions.

2. A gasket strip adapted to be placed within a metal channel to receive the edge of an adjoining element such as the edge of a glass and to conform and to adhere thereto, comprising a fibrous backing having a thin, flexible, permanently tacky coating thereon, said coating including rubber hydrocarbon, asphalt, a softener, and a filler, the rubber hydrocarbon and the asphalt being present in substantially equal proportions, said coating having adhesive properties falling within the range of six to fifteen pounds as measured by the Kinzer test.

3. A gasket strip adapted to be placed within a metal channel to receive the edge of an adjoining element such as the edge of a glass and to conform and to adhere thereto, comprising a woven fabric having a thin, compressible, permanently tacky coating thereon, said coating including rubber hydrocarbon, asphalt, rosin oil, petrolatum, cotton fibers, whiting, and cork granules, the rubber hydrocarbon and the asphalt being present in substantially equal proportions, said coating having adhesive properties falling within the range of six to fifteen pounds as measured by the Kinzer test.

4. A gasket strip adapted to be placed within a metal channel to receive the edge of an adjoining element such as the edge of a glass to conform and to adhere thereto comprising a fibrous backing impregnated with a moisture-resistant material, and a thin, compressible, permanently tacky coating on said backing, said coating containing cork particles, asphalt, and unvulcanized rubber hydrocarbon, the rubber hydrocarbon and the asphalt being present in said coating in substantially equal proportions.

BRUCE R. BILLMEYER.